US012627353B2

(12) United States Patent
Li et al.

(10) Patent No.: US 12,627,353 B2
(45) Date of Patent: May 12, 2026

(54) AIR TO GROUND SIGNALING ENHANCEMENT FOR CROSS-WAVEFORM INTERFERENCE MEASUREMENT AND REPORTING

(71) Applicant: QUALCOMM Incorporated, San Diego, CA (US)

(72) Inventors: Qiaoyu Li, Beijing (CN); Chao Wei, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/546,827

(22) PCT Filed: Apr. 15, 2021

(86) PCT No.: PCT/CN2021/087417
§ 371 (c)(1),
(2) Date: Aug. 17, 2023

(87) PCT Pub. No.: WO2022/217529
PCT Pub. Date: Oct. 20, 2022

(65) Prior Publication Data
US 2024/0129009 A1      Apr. 18, 2024

(51) Int. Cl.
*H04B 7/06*          (2006.01)
*H04B 17/336*        (2015.01)
*H04L 5/00*          (2006.01)

(52) U.S. Cl.
CPC ......... *H04B 7/0626* (2013.01); *H04B 7/0632* (2013.01); *H04B 17/336* (2015.01); *H04L 5/0007* (2013.01); *H04L 5/0023* (2013.01)

(58) Field of Classification Search
None
See application file for complete search history.

(56) References Cited

U.S. PATENT DOCUMENTS

| | | |
|---|---|---|
| 2018/0139648 A1 | 5/2018 | Park et al. |
| 2018/0192426 A1 | 7/2018 | Ryoo et al. |
| (Continued) | | |

FOREIGN PATENT DOCUMENTS

| | | |
|---|---|---|
| EP | 3567784 A1 | 11/2019 |
| WO | 2018089102 | 5/2018 |
| WO | 2020222621 A1 | 11/2020 |

OTHER PUBLICATIONS

CATT: "Discussion of NR Numerology", 3GPP Draft, 3GPP TSG RAN WG1 Meeting #85, R1-164249_NR_Numerology, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016 May 14, 2016 (May 14, 2016), XP051090037, 5 Pages, Section 2.

(Continued)

*Primary Examiner* — Minh Trang T Nguyen
(74) *Attorney, Agent, or Firm* — Harrity & Harrity, LLP

(57) ABSTRACT
A method includes: communicating with a base station using a first waveform; receiving configuration information specifying an interference measurement resource associated with a second waveform different from a channel measurement resource associated with the first waveform; performing channel measurement associated with the first waveform and interference measurement associated with the second waveform, according to the configuration information; and providing channel state information (CSI) feedback to the base station, the CSI feedback based at least in part on the channel measurement and the interference measurement.

23 Claims, 9 Drawing Sheets

(56) References Cited

U.S. PATENT DOCUMENTS

| | | | |
|---|---|---|---|
| 2019/0246387 A1 | 8/2019 | Lee et al. | |
| 2022/0286325 A1* | 9/2022 | Gunturu | H04L 25/0202 |
| 2023/0422195 A1* | 12/2023 | Yao | H04B 7/18513 |
| 2024/0236736 A1* | 7/2024 | Oh | H04L 1/0067 |

OTHER PUBLICATIONS

CMCC: "Discussion on Implicit Compatibility to Support ATG Scenarios in NTN", 3GPP TSG RAN WG1 #102-e, R1-2006213, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 28, 2020, XP051915252, pp. 1-9.

Huawei, et al., "UCI Piggyback on Pusch", 3GPP Draft, 3GPP TSG RAN WG1 Meeting #90, R1-1712195, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315012, 5 Pages.

Intel Corporation: "UCI Multiplexing on to PUSCH", 3GPP Draft, 3GPP TSG RAN WG1 Meeting #89, R1-1707399, Intel UCI on PUSCH, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 7, 2017 (May 7, 2017), XP051263058, 4 Pages.

International Search Report and Written Opinion—PCT/CN2021/087417—ISA/EPO—Oct. 4, 2021.

Partial International Search Report—PCT/CN2021/087474—ISA/EPO—Oct. 8, 2021.

* cited by examiner

| Param/Numerlogy (u) | -1 | -1B | 0 | 1 | 1 (ECP) | 2 | 2 (ECP) | 2 (eECP) | 3 | 4 |
|---|---|---|---|---|---|---|---|---|---|---|
| SCS (KHz) | 7.5 | 7.5 | 15 | 30 | 30 | 60 | 60 | 60 | 120 | 240 |
| Sym-Duration (us) | 133.3 | 133.3 | 66.67 | 33.33 | 33.33 | 16.67 | 16.67 | 16.67 | 8.33 | 4.17 |
| CP (us) | 9.40 | 9.40 | 4.69 | 2.34 | 8.33 | 1.17 | 4.16 | 8.33 | 0.57 | 0.29 |
| Total-Sym-Duration (us) | 142.7 | 142.7 | 71.35 | 35.68 | 41.67 | 17.84 | 20.83 | 25 | 8.92 | 4.46 |
| # OFDM syms Per slot | 7 | 14 | 14 | 14 | 12 | 14 | 12 | 10 | 14 | 14 |

FIG. 4

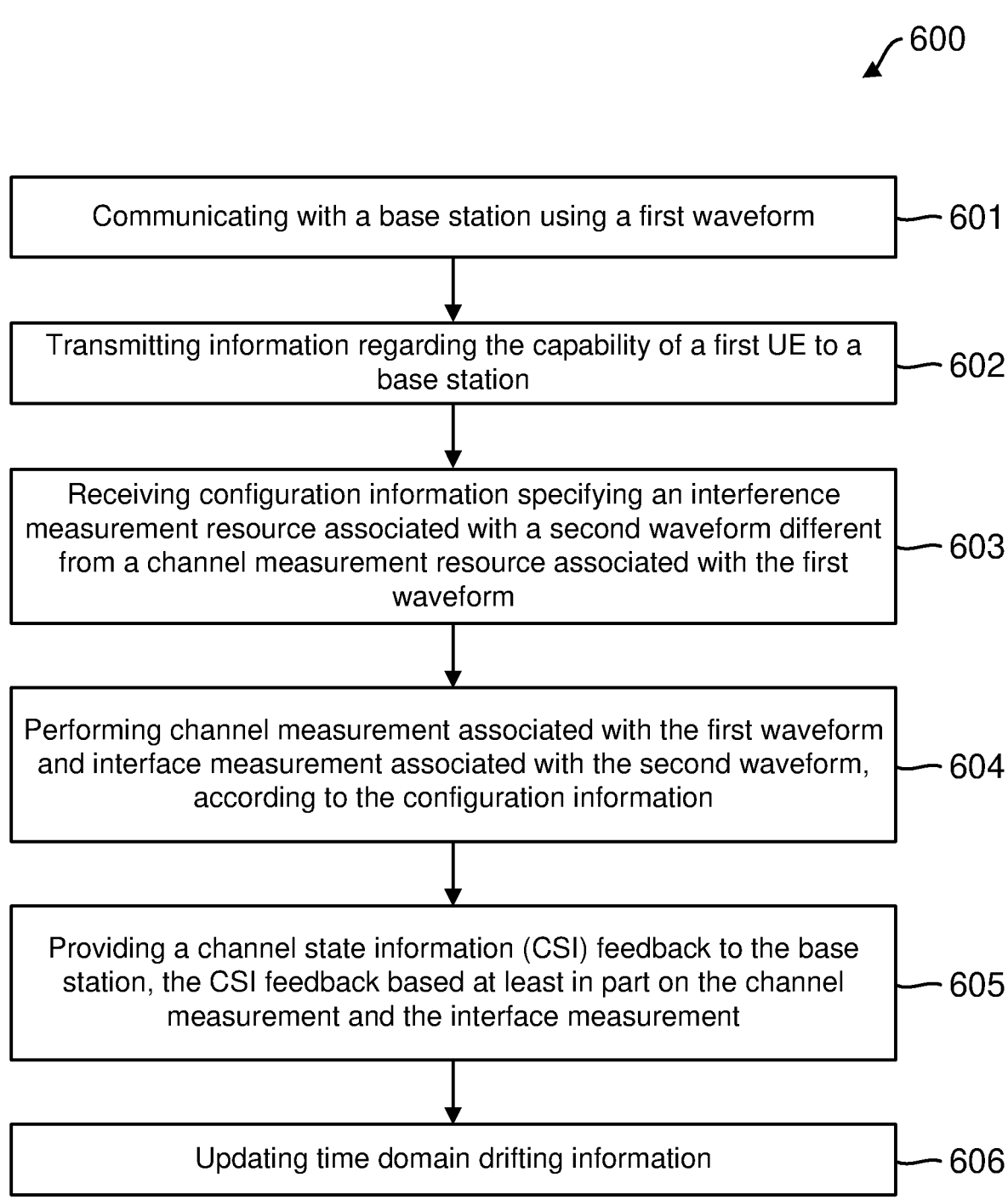

600

Communicating with a base station using a first waveform — 601

Transmitting information regarding the capability of a first UE to a base station — 602

Receiving configuration information specifying an interference measurement resource associated with a second waveform different from a channel measurement resource associated with the first waveform — 603

Performing channel measurement associated with the first waveform and interface measurement associated with the second waveform, according to the configuration information — 604

Providing a channel state information (CSI) feedback to the base station, the CSI feedback based at least in part on the channel measurement and the interface measurement — 605

Updating time domain drifting information — 606

FIG. 6

AIR TO GROUND SIGNALING ENHANCEMENT FOR CROSS-WAVEFORM INTERFERENCE MEASUREMENT AND REPORTING

CROSS-REFERENCE TO RELATED APPLICATIONS

The present application is a 35 U.S.C. 371 National Phase entry of Patent Cooperation Treaty (PCT) Application No. PCT/CN2021/087417, filed Apr. 15, 2021, which is hereby incorporated by reference in its entirety as if fully set forth below and for all applicable purposes.

TECHNICAL FIELD

This application relates to wireless communication systems, and more particularly to techniques to mitigate air to ground (ATG) interference in user equipment (UE) by measuring and reporting interference from other waveforms.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR technology may also make use of a variety of different base station and user equipment technologies to maintain communication at acceptable throughput rates. An example type of base station and user equipment technology includes air to ground (ATG) applications. An example of an ATG application includes a base station having antennas oriented generally upward communicating with an aircraft-based UE. ATG base stations may have large radio frequency (RF) footprints, e.g., a radius of hundreds of kilometers. By contrast, a typical terrestrial base station may have a footprint of only a few kilometers. Therefore, an ATG base station may include within its footprint multiple terrestrial base stations communicating with a multitude of terrestrial UEs. Accordingly, there is a need in the art to address channel state measurement and interference measurement by terrestrial UEs receiving signals from ATG user equipment.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method includes communicating with a base station using a first waveform; receiving configuration information specifying an interference measurement resource associated with a second waveform different from a channel measurement resource associated with the first waveform; performing channel measurement associated with the first waveform and interference measurement associated with the second waveform, according to the configuration information; and providing channel state information (CSI) feedback to the base station, the CSI feedback based at least in part on the channel measurement and the interference measurement.

In another aspect, a UE includes: a transceiver; and a processor configured to control the transceiver, the processor further configured to: process configuration information from a base station (BS) specifying a channel measurement resource associated with a first waveform and an interference measurement resource associated with a second waveform different from the first waveform, the first waveform corresponding to a downlink configuration of the UE; perform channel measurement associated with the first waveform and interference measurement associated with the second waveform, according to the configuration information; and provide channel state information (CSI) feedback to the base station, the CSI feedback based at least in part on the channel measurement and the interference measurement.

In another aspect, a UE includes: means for receiving configuration information specifying a channel measurement resource associated with a first waveform used by a user equipment (UE) on its downlink and an interference measurement resource associated with a second waveform different from the first waveform and associated with air to ground (ATG) interference directed toward the downlink; means for performing channel measurement using the channel measurement resource and performing interference measurement associated with the interference measurement resource; and means for providing a channel state information (CSI) report to a base station, the CSI report based at least in part on the channel measurement and the interference measurement.

In another aspect, a non-transitory computer-readable medium having program code recorded thereon includes: code for receiving configuration information specifying a channel measurement resource associated with a first waveform used by a user equipment (UE) on its downlink and an interference measurement resource associated with a second waveform different from the first waveform; code for performing channel measurement associated with the first waveform and interference measurement associated with the second waveform, according to the configuration information; and code for providing a channel state information (CSI) report to a base station, the CSI report based at least in part on the channel measurement and the interference measurement.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 is an illustration of example numerologies according to some aspects of the present disclosure.

FIG. 6 is an illustration of an example method according to some aspects of the present disclosure.

DETAILED DESCRIPTION

Figure 1:
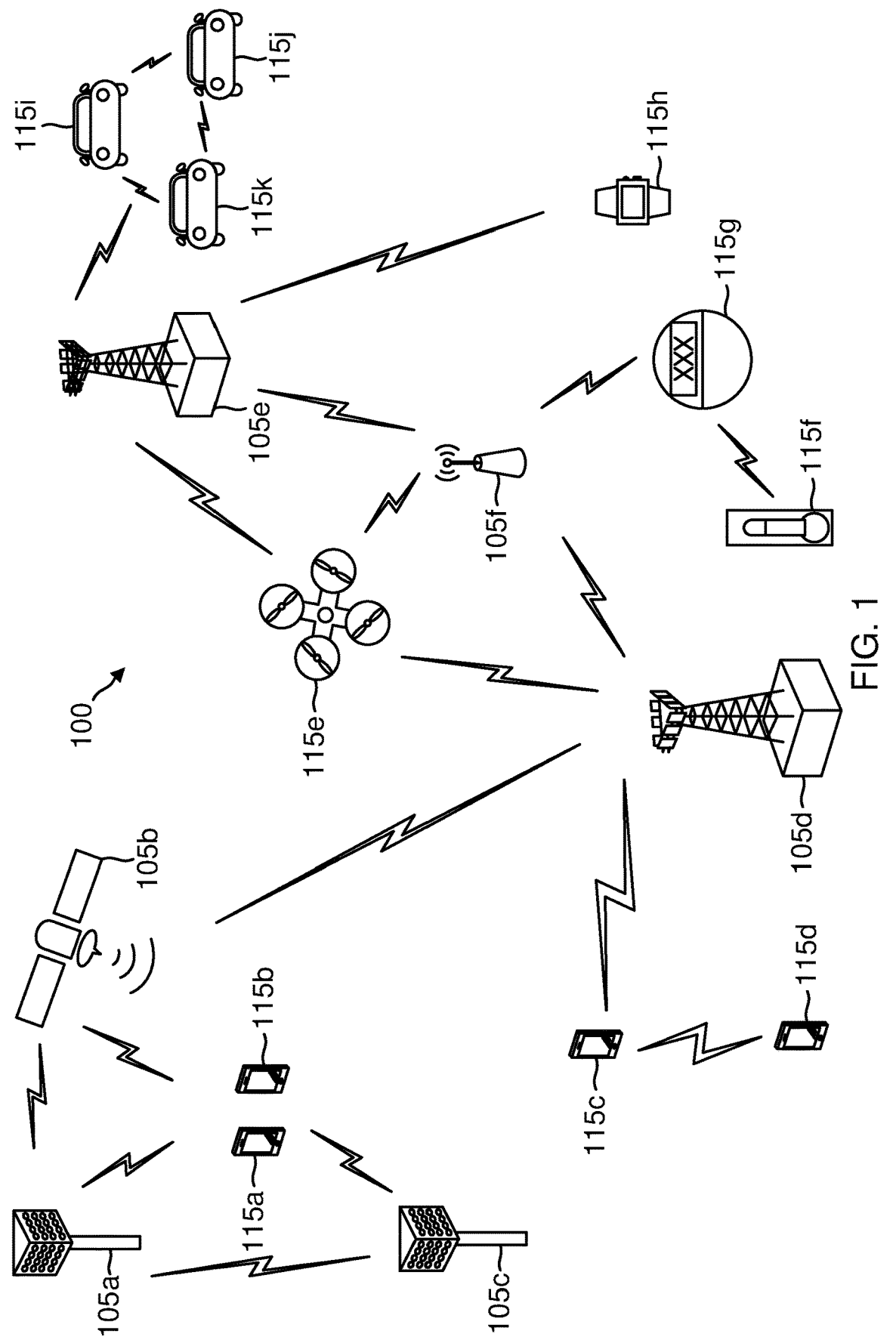
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As described in more detail below, various implementations include methods of wireless communication, apparatuses, and non-transitory computer-readable media that provide support for systems that may experience interference from air to ground (ATG) sources. For instance, a piece of terrestrial user equipment (UE) may experience downlink interference from the uplink signals of ATG UEs. Similarly, one ATG UE may experience interference from a second ATG UE. ATG communication may be more likely to cause interference with terrestrial devices for a number of reasons. One reason includes that future ATG applications may use waveforms or numerologies that do not align with traditional terrestrial numerologies. Another reason is that time alignment in terrestrial systems may be different from a time alignment in ATG systems. Thus, techniques described herein may include a base station or node B configuring a UE to measure interference on a different waveform than a particular waveform that the UE is currently using for downlink communications. For instance, the base station may configure the UE to measure interference measurement resources associated with a first waveform different from channel measurement resources associated with a second waveform which the UE uses for downlink communications with the base station. The configuration information may also include time domain drifting information. Furthermore, some implementations may include the UE informing the base station of its capabilities for monitoring other waveforms.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing (SCS) may occur with 15 kHz, for example over 5, 10, 20 MHz, and the like bandwidth (BW). For other various outdoor and small cell coverage deployments of TDD greater than 3 GHz, subcarrier spacing may occur with 30 kHz over a 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink (UL) and downlink (DL) to meet the current traffic needs.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIG. 7 may be performed by any of BSs 105.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). ABS for a macro cell may be referred to as a macro BS. ABS for a small cell may be referred to as a small cell BS, a pico BS, a femto BS or a home BS. In the example shown in FIG. 1, the BSs 105b, 105d, and 105e may be regular macro BSs, while the BSs 105a and 105c may be macro BSs enabled with one of three dimension (3D), full dimension (FD), or massive MIMO. The BSs 105a and 105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

Figure 5:
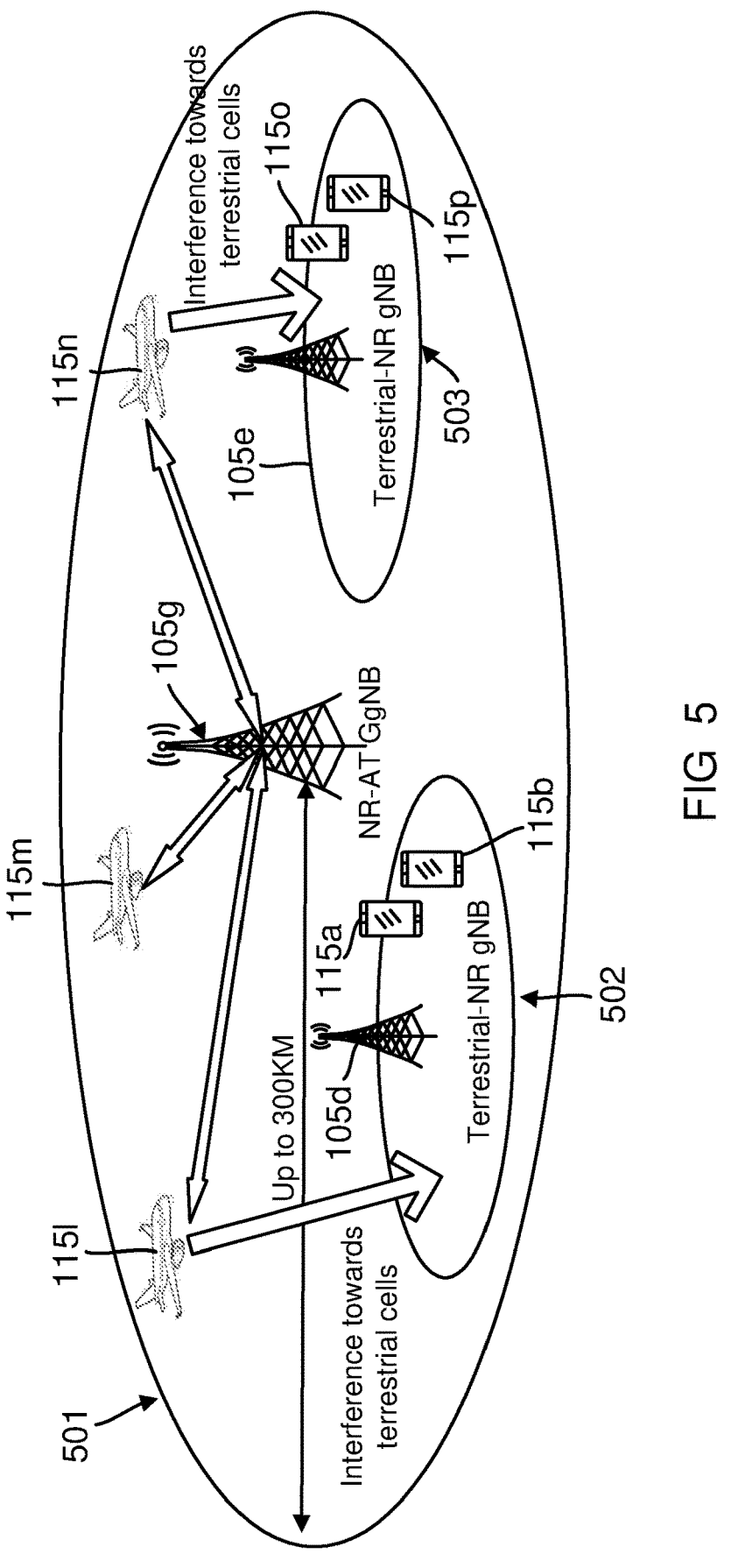
FIG. 5 is an illustration of an example relationship between an air to ground (ATG) cell and two different terrestrial cells, including illustrating interference among UEs, according to some aspects of the present disclosure.

FIG. 5 provides other examples of BSs 105 and UEs 115, and it is understood that those BSs 105 and UEs 115 operate the same as or similarly to those described with respect to FIG. 1. For instance, FIG. 5 illustrates an ATG BS 105g and three ATG UEs 115l-n. These additional assets are described in more detail below.

Now returning to FIG. 1, in operation, the BSs 105a and 105c may serve the UEs 115a and 115b using 3D beamforming and coordinated spatial techniques, such as coordinated multipoint (CoMP) or multi-connectivity. The macro BS 105d may perform backhaul communications with the BSs 105a and 105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105. Additionally, BS 105b is shown as a non-terrestrial network (NTN) resource, such as a satellite that orbits the earth. In this example, BS 105b may include multiple antenna arrays, each array forming a relatively fixed beam. BS 105b may be configured as a single cell with multiple beams and BWPs, as explained in more detail below.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolu-tion. In some examples, the random access preamble, the RAR, the connection request, and the connection response can be referred to as message 1 (MSG1), message 2 (MSG2), message 3 (MSG3), and message 4 (MSG4), respectively. In some examples, the random access proce-dure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL commu-nication signal to the BS 105 via a PUSCH and/or PUCCH according to a UL scheduling grant.

In some aspects, the BS 105 may communicate with a UE 115 using hybrid automatic repeat request (HARQ) tech-niques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowl-edgement (ACK) to the BS 105. Conversely, if the UE 115 fails to receive the DL transmission successfully, the UE 115 may transmit a HARQ negative-acknowledgement (NACK)

to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). ABS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a thresh-old. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In the example of NTN resource 105*b*, it may transmit SSBs on each of its beams at scheduled times, even if the beams do not steer. In some instances, each beam and its corresponding characteristics may be identified by a beam index. For instance, each SSB may include an indi-cation of a beam index corresponding to the beam used for the SSB transmission.

The UE 115 may determine signal measurements, such as reference signal received power (RSRP) and/or reference signal received quality (RSRQ), for the SSBs at the different beam directions and select a best DL beam. The UE 115 may indicate the selection by transmitting a physical random access channel (PRACH) signal (e.g., MSG1) using PRACH resources associated with the selected beam direction. For instance, the SSB transmitted in a particular beam direction or on a particular beam may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RSs by sweeping narrower beams over a narrower angular range and the UE 115 may report the best DL beam to the BS 105. When the BS 105 uses a narrower beam for transmission, the BS 105 may apply a higher gain, and thus may provide a better performance (e.g., a higher signal-noise-ratio (SNR)). In some instances, the channel condition may degrade and/or the UE 115 may move out of a coverage of an initially selected beam, and thus the UE 115 may detect a beam failure condition. Upon detecting a beam failure, the UE 115 may perform beam handover.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Figure 2:
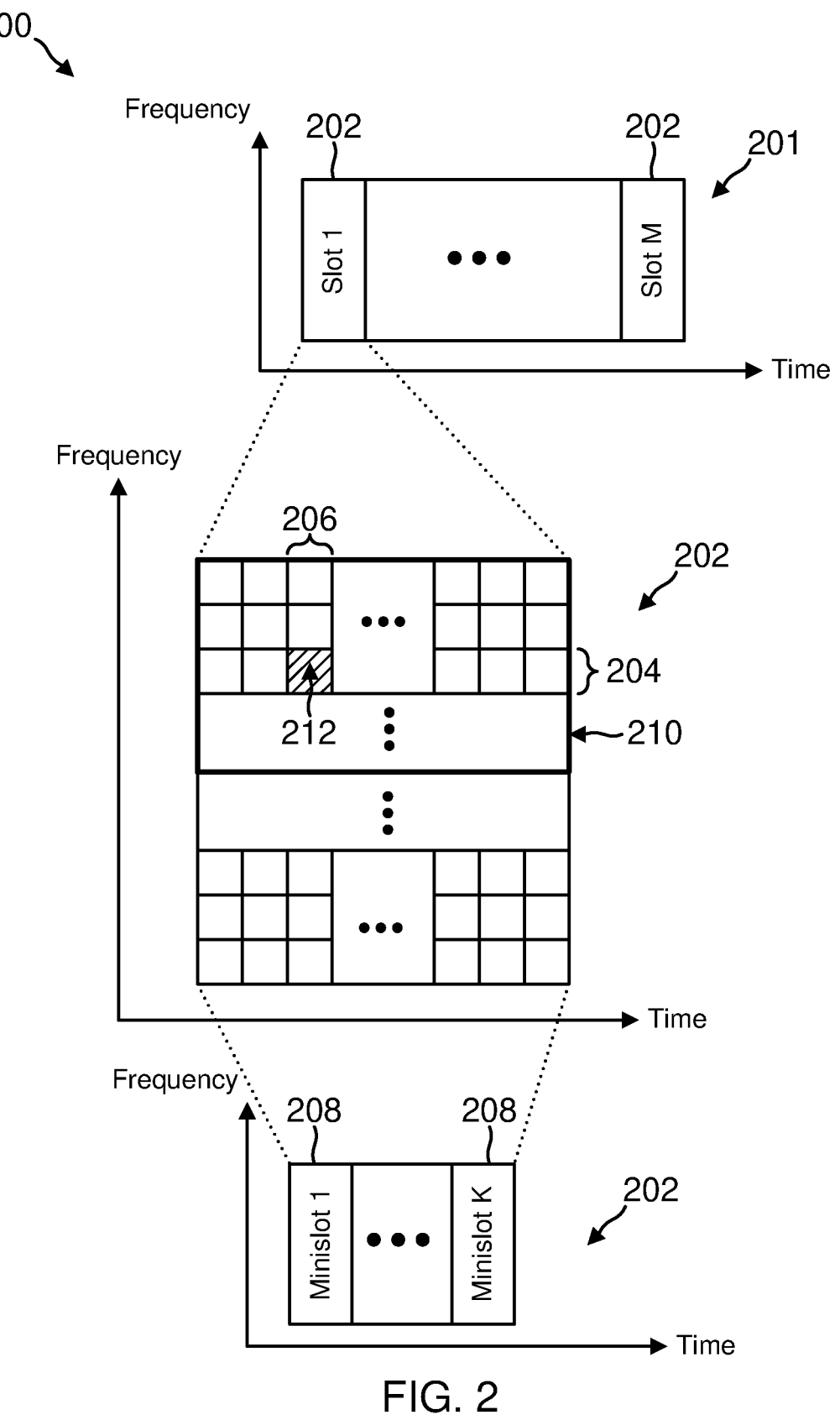
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP). One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208.

Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a RB 210 (e.g., including about 12 subcarriers 204).

Figure 3:
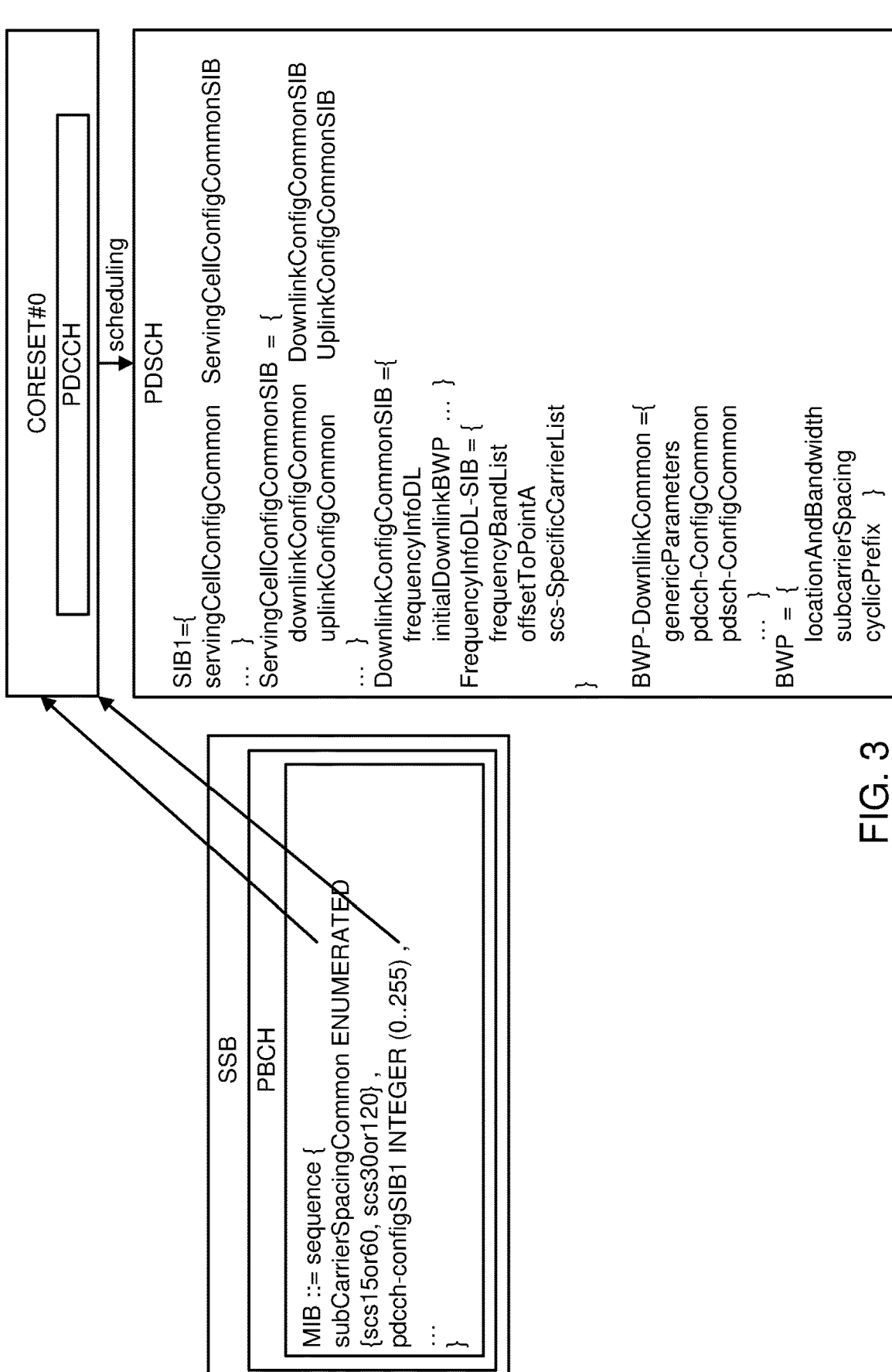
FIG. 3 illustrates a block diagram of an example SSB, according to some aspects of the present disclosure.

FIG. 3 illustrates a process of starting from an SSB to obtain the information about an initial downlink BWP and an initial uplink BWP part. In this implementation, the SSB includes a PBCH that carries MIB. A UE that receives the SSB decodes the SSB to acquire the MIB. The UE then parses the contents of the MIB, which point to a CORESET #0. The CORESET #0 includes a Physical Downlink Control Channel (PDCCH) and the PDCCH schedules system information block 1 (SIB1) on a PDSCH, and the SIB1 has information elements to identify an initial downlink BWP and an initial uplink BWP. The UE parses the contents of the SIB1, finds its initial downlink BWP and its initial uplink BWP and then uses the initial downlink BWP and uplink BWP to communicate with the BS for further configuration. For instance, the UE may communicate with the BS to be assigned a dedicated BWP on a particular beam for data transmission. Of course, some aspects of the disclosure may use a different MIB, a different CORESET #0, or a different SIB 1. The SIB1 also identifies parameters relevant to numerology, such as subcarrier spacing and cyclic prefix.

FIG. 4 is a table illustrating a variety of example numerologies that may be applied in one or more implementations. In this example, each column provides a different numerology, where a numerology includes a set of parameters for communication between a UE and a base station. The first row designates a parameter or numerology (u), which may change among the different columns. For instance, the set of numerologies depicted in the table of FIG. 4 assumes a formula where subcarrier spacing (SCS) is equal to $15 * 2^u$ KHz. Thus, when u is equal to −1, then the SCS equals 7.5 kHz. Similarly, when u is equal to 0, then SCS equals 15 kHz, and when u is equal to 2, SC S equals 60 KHz.

The second and third rows display symbol duration and cyclic prefix (CP) in microseconds. The fourth row is total symbol duration in microseconds, and it equals the sum of the second and third rows. The fifth row provides a total number of OFDM symbols per slot. For example, the column corresponding to numerology −1 has seven OFDM symbols per slot, whereas the column corresponding to numerology −1B has 14 OFDM symbols per slot. Traditional LTE numerologies include 14 OFDM symbols per slot. However, with new uses for NR being pioneered, other numbers of OFDM symbols per slot are being considered, such as 7 (as in numerology −1), 12 (as in numerology 1 ECP), or 10 (as in numerology 2 e ECP).

It has been observed that in some ATG applications, propagation delay due to reflection off of tall buildings or mountains may be as high as 8.33 μs. Thus, the propagation delay of ATG applications may be significantly more than that expected from NTN applications or terrestrial applications. Some implementations described herein include a cyclic prefix that is equal to or greater than 8.33 μs to accommodate the propagation delay that might be expected in some ATG applications. Another issue in ATG applications might be Doppler effect. For instance, at 700 MHz, a maximum line of sight Doppler effect might be as large as 0.77 kHz. As center frequency increases, the line of sight Doppler effect might increase more than proportionally. For instance, at 3.5 GHz, the maximum line of sight Doppler effect might be around 3.89 kHz, and at 4.8 GHz, the maximum line of sight Doppler effect might be around 5.33 kHz. In some instances, a UE or a base station may have hardware and software capable of compensating for Doppler effect that is as high as about 10% of the SCS. Some UEs or base stations may include better or poorer capability, and this is just an example. Nevertheless, for implementations assuming compensation abilities exist for up to 10% of SCS, then in a numerology using 700 MHz, an SCS of 7.5 kHz or greater would be desirable. Similarly, in a numerology using a center frequency of 3.5 GHz, an SCS of 30 kHz or 60 kHz would be desirable, and in a numerology using 4.8 GHz as a center frequency, an SCS equal to or greater than 60 kHz would be desirable.

However, these concerns may also run into other constraints, such as available bandwidth on a center frequency or attenuation expected to affect a center frequency. Thus, while numerology −1 may have ample SCS and CP at 700 MHz, that center frequency may not provide a desired amount of bandwidth for an ATG UE that is built for 1 GHz or more bandwidth. Similarly, numerologies 3 and 4 may be best reserved for millimeter wave applications, though millimeter wave may experience attenuation that makes it unsuitable for the long distances covered by an ATG base station cell.

One possible solution might be to use numerology 1 ECP, which has an SCS of 30 kHz and a cyclic prefix of 8.33 μs. Numerology 1 ECP may be used with 3.5 GHz, thereby providing SCS of 30 kHz and CP of 8.33 μs. Those parameters may provide acceptable performance in an ATG application, considering propagation delay, Doppler effect, and expected attenuation. Similarly, numerology 2 eECP may be used with either 3.5 GHz or 4.8 GHz as a center frequency to provide SCS of 60 kHz and CP of 8.33 μs. Once again, these parameters may provide acceptable performance in an ATG application. The numerologies including "ECP" refer to an extended CP, which is accomplished by reducing a number of OFDM symbols per slot. Disadvantages associated with ECP numerologies include a reduction in efficiency due to the relative length of the CP versus the total symbol duration as well as mismatch with traditional numerologies having 14 symbols per OFDM slot. However, in some applications, the disadvantages of those numerologies may be outweighed by the advantages. In fact, for any given application, an engineer may pick a numerology for use based on a variety of factors. ATG applications present their own special considerations, propagation delay and Doppler effect being among them, which makes them different from other applications, such as a NTN and car-based terrestrial.

As noted above, traditional LTE numerologies include 14 OFDM symbols per slot. The number of OFDM symbols allow different emitters to coexist more easily. In the case of numerology −1, it has seven OFDM symbols per slot, but it aligns with traditional numerologies including 14 OFDM symbols per slot since 14 is a multiple of seven. However, the other numerologies in the table of FIG. 4 may include 12 OFDM symbols per slot or 10 symbols per slot in order to accommodate a larger CP. Since neither 10 nor 12 are a multiple of seven, such numerologies create misalignment when coexisting with other applications using seven or 14 OFDM symbols per slot. Thus, ATG applications adopting a numerology using 10 or 12 (or some other number of OFDM symbols per slot) may cause incrementally more interference with terrestrial UEs.

While FIG. 4 describes different numerologies that may be used in ATG applications, other options may exist as well. For instance, as wireless communications progress, other waveforms are being developed and used. The example above in FIG. 4 assumes OFDM waveforms. Other waveforms that may be used include orthogonal time frequency space (OTFS), direct Fourier transform spread OFDM (DFT-s-OFDM), single carrier waveform, CDMA, GSM. OTFS is a particular case of time frequency spreading, and other time frequency spreading waveforms may be considered for use in various implementations as well.

Looking to OTFS first, it may be implemented in some ATG applications due to various advantageous features. For instance, OTFS may be used with any appropriate subcarrier spacing, such as 30 kHz or 60 kHz. Therefore, OTFS may provide acceptable performance when Doppler effect is expected to be relatively high. Also, OTFS may omit using a CP, which may increase its spectral efficiency compared with OFDM waveforms having a larger CP. Nevertheless, OTFS does have other concerns, such as the use of more complex receivers to account for inter-symbol interference in the time domain. While more complex receivers may be acceptable for use in projects that are less cost-sensitive, more cost-sensitive projects may be less likely to adopt the complex receivers associated with OTFS. Nevertheless, as time goes on, the cost of hardware and software capable of communicating using OTFS may decrease, thereby making OTFS more acceptable to general aviation. In the meantime, OTFS receivers may be more likely to be adopted by commercial and governmental aircraft.

In one use case, OTFS may be desirable for use during some flight scenarios. For instance, OTFS decoding latency may be higher than in OFDM because of the increased complexity of decoding in OTFS. OTFS may be a desirable option to choose when the Doppler effect is high, such as when an aircraft is en route. However, OFDM with its lower latency may be desirable when the Doppler effect is lower, such as during takeoff and landing. Accordingly, some ATG systems may be capable of switching between waveforms as appropriate.

Different waveforms may cause interference. For instance, for a terrestrial UE using OFDM for its downlink, it may experience increased interference from an uplink signal from an ATG UE using OTFS both because of the high power expected to be used by the ATG UE as well as the difference in time domain and frequency domain properties present in the OTFS waveform. For instance, OTFS may include a shorter symbol duration relative to OFDM, and that unmatched symbol alignment may increase interference. In other words, just as numerologies with non-aligning numbers of symbols in a slot may be expected to cause increased interference, an OTFS waveform spreads data over both the time and frequency domains and, thus, has increased non-alignment issues when interfering with an OFDM downlink. So as ATG applications may increase use of other waveforms, such as time frequency spreading and others, terrestrial UEs may expect to see interference from those sources.

Figure 7:
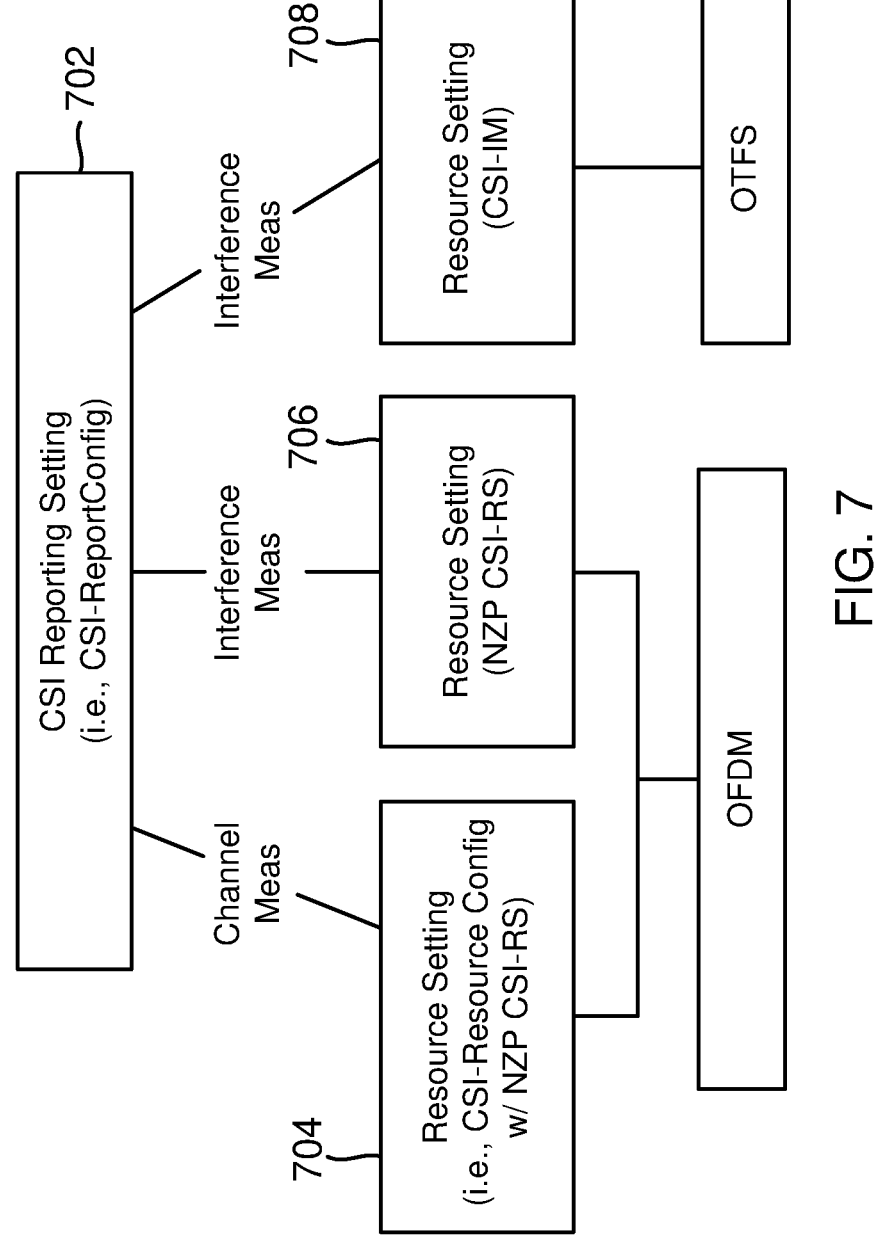
FIG. 7 is an illustration of an example configuration technique according to some aspects of the present disclosure.

In addition to the misalignment caused by different numerologies in different waveforms, various ATG applications may experience propagation delays significantly different from those experienced by terrestrial UEs, and that difference in timing alignment may further increase interference experienced by terrestrial UEs. Thus, various implementations herein, such as those described with respect to FIGS. 6 and 7, provide solutions to perform channel measurement and interference measurement when a UE may experience interference from a different waveform, such as might be experienced from ATG applications.

FIG. 5 is an illustration of an example wireless communication network according to one implementation. FIG. 5 is offered to illustrate coexistence of an ATG BS 105g with a plurality of terrestrial BSs 105d, 105e. Terrestrial BSs 105d may be substantially the same as the terrestrial BS 105d of FIG. 1. Also, the UEs 115a, 115b may be the same as or similar to UEs 115a, 115b of FIG. 1. Terrestrial BS 105e may also be the same as or similar to any of the BSs 105 of FIG. 1, and UEs 115o, 115p may also be the same as or similar to any of the BSs of FIG. 1. And although not shown in FIG. 5, ATG BS 105g may have a backhaul connection with either one or both of the terrestrial BSs 105d, 105e.

ATG BS 105g may be implemented in any appropriate manner, although in one example it has antennas that are directed upward for better reception by the ATG UEs 115l-n. The UEs 115l-n may include hardware mounted to a bottom of an aircraft to facilitate transmission and reception with the antennas of ATG BS 105g. Further in this example, ATG BS 105g may communicate using greater power than would traditionally be used by any of the terrestrial BSs 105d, 105e. The greater power allows ATG BS 105g to provide transmission and reception over a large cell 501, which in this example is shown as extending up to 300 km. Of course, the scope of implementations includes any appropriate size of cell 501, as 300 km is merely one example. The ATG BSs 115l-n may also transmit using a higher power than would traditionally be used with any of the terrestrial UEs 115.

FIG. 5 shows that the terrestrial cells 502, 503 may be encompassed by the large area of ATG cell 501. In some implementations, ATG cell 501 may encompass more or fewer terrestrial cells, and some terrestrial cells may be partially within and partially without cell 501. The two terrestrial cells 502, 503 are shown encompassed by ATG cell 501 for ease of illustration, and it is understood that in some applications an example ATG cell 501 may encompass tens or even hundreds of terrestrial cells within a 200 km or 300 km radius.

An option for multiplexing ATG communications and terrestrial NR is frequency division multiplexing, although that may suffer from low spectral efficiency in some instances. Another more spectral-efficient way to allow a non-orthogonal use of radio frequencies among ATG assets and terrestrial assets is OTFS, which may cause other issues to arise. For instance, spectral efficiency may be low at higher frequencies (e.g., 4.8 GHz) due to larger Doppler effect and propagation delay.

Various implementations herein propose to use NR techniques with different waveforms than OFDM in order to achieve a higher spectral efficiency considering large Doppler effect and delays that might be expected in ATG applications. In doing so, there may be interference, such as illustrated in FIG. 5. For instance, FIG. 5 illustrates interference from aircraft toward terrestrial UEs and BSs. In the time domain, interference toward either terrestrial base stations' uplink reception or toward terrestrial UEs' downlink reception may be an issue. In the frequency domain, interference towards terrestrial base stations' uplink reception or interference toward terrestrial UEs' downlink reception (if uplink and downlink frequency bands are reversely used in ATG) may also be an issue. However, the largest contributor toward interference in FIG. 5 is illustrated as that caused by downlink transmission by UEs 115l-n as it is experienced by UEs 115a, b, o, p. Specifically, the orientation and power of UEs 115l-n may cause noticeable interference with the downlink reception by the UEs 115 *a, b, o,*

*p*. Other less noticeable interference may include ATG base station transmission toward terrestrial base stations' uplink reception as well as ATG base station toward terrestrial UEs' downlink reception. It is also possible in some instances that one of the ATG UEs may cause interference with another of the ATG UEs, depending on their spatial positioning.

In the example of FIG. 5, any one of UEs 115a, 115b may be configured by base station 105d to perform channel measurement and interference measurement. Similarly, any one of UEs 115o, 115p may be configured to perform channel measurement and interference measurement by base station 105e. The UEs 115 may be configured to perform interference measurement and may perform interference measurement, such as in method 600, described in more detail below.

FIG. 6 is an illustration of an example method 600 for channel measurement and interference measurement for multiple waveforms, such as may be performed by a UE experiencing interference from an ATG source, according to one implementation. Method 600 may be performed by a UE, such as any of the UEs 115 of FIGS. 1 and 5. For instance, the UE may be a terrestrial UE or an ATG UE. The actions of method 600 are performed as the UE communicates with the BS, which may be any of the BSs 105 of FIGS. 1 and 5.

At action 601, the UE communicates with a base station using a first waveform. For instance, the UE may be a terrestrial UE that uses OFDM waveforms as default. In another example, the UE may include an ATG UE that can switch between different waveforms, such as OFDM, OTFS, DFT-s-OFDM, single carrier, and the like. It should be noted that the scope of implementations is not limited to any particular waveforms. Specifically, while the example described with respect to the other actions of method 600 may refer to OFDM and OTFS, the scope of implementations may include any combination of waveforms as appropriate. In this example, the UE may be camping on the BS, or the transmitting may take place during an initial access procedure or later when user data is being transmitted.

At action 602, the UE transmits information regarding its capabilities to a BS. In this example the capabilities refer to numbers and types of waveforms (including numerologies) that can be simultaneously monitored and associated with the same CSI report, or associated with a number of CSI reports, or associated with a number of CSI Processing Units.

In the case of an ATG UE, some commercial aircraft may include robust UEs that may be able to support many numerologies and waveforms. Accordingly, such a UE may also be able to monitor and cancel interference from any of those supported waveforms. By contrast, general aviation aircraft and terrestrial UEs may be less robust and may support a fewer number of waveforms. Accordingly, such UEs may be less able to monitor waveforms when compared to commercial jet ATG UEs. In other words, different kinds of UEs may have different kinds of capabilities and, thus, action 602 allows the UE to report its capabilities to the BS. Also, each waveform may be separately configured for channel measurement resources and interference measurement resources, so the capability reporting may include this level of granularity.

For instance, in a use case example, a particular UE may report to the BS that it supports monitoring only OFDM and OTFS with identical SCS. In another example, a UE may report to a BS that it supports only monitoring OFDM and OTFS, where the SCS of the OTFS waveform is equal to or smaller than the SCS of the OFDM waveform but no less than half of the OFDM waveform's SCS. Thus, the second example provides more robustness than does the first example. In a third example, a UE may report that it supports monitoring any combination of waveforms specified in any given standard, which would be even more robust than the second example.

An action 603, the UE receives configuration information from the base station, and the configuration information may include configuration for CSI feedback, including channel measurement, interference measurement, and reporting requirements. Additionally, the configuration information may be based at least in part on the capability of the first UE. For instance, once the BS is aware of the capabilities of the UE, then it may configure the UE to monitor at least one additional waveform according to the capabilities of the UE. In this example, the UE is configured to measure interference measurement resources associated with a second waveform and different from channel measurement resources associated with the first waveform. Furthermore, the base station may configure the UE to include the results in the same CSI reporting.

Action 603 may be further understood with reference to FIG. 7, which illustrates example configuration information. In FIG. 7, the CSI reporting setting element 702 is an information element within RRC. In this example, the CSI reporting setting is a CSI-ReportConfig signal. The resource setting elements 704-708 are sub-information elements within the CSI reporting setting element 702. In the example of FIG. 7, the BS configures the UE to perform channel measurement using a nonzero power channel state information reference signal (NZP-CSI-RS) as a resource element (resource setting element 704) and to perform interference measurement also using NZP-CSI-RS (resource setting element 706). The BS also configures the UE to perform interference measurement using a channel state information interference measurement (C SLIM) (resource setting element 708). In this example, the resource settings 704 and 706 cause the UE to perform channel measurement and interference measurement (as well as reporting) with respect to the first waveform, which in this example is an OFDM waveform on which the UE expects to receive data on PDSCH. By contrast, the resource setting element 708 causes the UE to monitor another waveform, in this case an OTFS waveform, and to perform interference measurement and reporting with respect to that OTFS waveform. The OTFS waveform in this example may include an interfering waveform from another source, such as an ATG UE. It should also be noted that the UE is configured for channel measurement and interference measurement separately for each waveform. Specifically, each waveform may have different channel measurement resources and interference measurement resources, and the configuration information from the BS performs separate configuration for each waveform. Also, while FIG. 7 illustrates channel measurement and interference measurement for the first waveform and only interference measurement for the second waveform, the scope of implementations is not so limited. Rather, the scope of embodiments may include performing channel measurement for the second waveform as well. Once again, while this particular example refers to OFDM and OTFS, the scope of implementations may include any appropriate combination of waveforms.

Action 603 may include any of a variety of appropriate configuration options. In one implementation, resource setting element 708 explicitly provides waveform information, including identifying the type of waveform as well as identifying the resource element to be measured. It should be noted that different waveforms may include different resource elements for measurement. In this example, OTFS is assumed to include a resource element called CSI-IM, similar to CSI-IM found in OFDM waveforms. However, it is understood that different waveforms may have different resource elements, and resource setting element 708 may identify any defined resource element as appropriate. In another example, it may be known ahead of time that a particular interfering UE may associate particular ones of its bandwidth parts or component carriers with particular waveforms, in which case the resource setting element 708 may identify a particular bandwidth part or component carrier to monitor as well as the particular resource element to measure.

Additionally in this example, the configuration information may be per-resource or per-set, as appropriate. Also, the individual resource elements identified by resource setting elements 704-708 may be periodic, semi-persistent (activated and deactivated by a media access control-control element, MAC-CE), or aperiodic (triggered by DCI).

As noted above, in some examples, the waveform associated with resource setting element 708 may come from an ATG source, and ATG sources may be subject to time domain drifting due to large distances and multi-path effects. Accordingly, some implementations may include time domain drifting information within the configuration information of action 603.

In one example, for a periodical interference measurement resource, the UE may be further configured with time-domain drifting information associated with the interference measurement resource. The configuration information may include time domain offsets associated with the starting slot of the interference measurement resource. The time domain offset may be given in terms of a symbol of a monitored bandwidth part or in explicit time units, such as microseconds or milliseconds. Additionally, the time domain offset may drift, so time domain drifting rate information may also be provided. Time domain drifting rate information may refer to updating the time domain offset with a given amount of more offset after a certain number of slots or symbols. The additional offset may be configured either in terms of symbols or in explicit time units.

As far as configuring the time domain offset and drifting rate information, it may be specified in RRC. For instance, element 708 may include a further resource element for time domain drifting information, where than information element may be associated with a particular interference measurement resource or interference measurement resource set, as appropriate. In another example, the CSI-ReportConfig signal (e.g., element 702) may include information elements to address time domain drifting. Thus, in one example, one or multiple time-domain drifting information elements are associated with one or multiple interfering aircraft UEs configured for a certain CSI-ReportConfig, and each one comprises a time domain drifting information index. In another example, an interference measurement resource comprises a time domain drifting information index associated with the ones configured in the CSI-ReportConfig.

Further in action 603, the UE processes the configuration information and sets its behavior consistent with the configuration information.

At action 604, the UE performs channel measurement associated with the first waveform and interference measurement associated with the second waveform, according to the configuration information of action 603. In the example of FIG. 7, within the first waveform (the OFDM waveform), the UE performs channel measurement and interference measurement according to the NZP CSI-RS resource element. By contrast, in the example of FIG. 7, within the second waveform the UE performs interference measurement according to the CSI-IM resource element.

Action 604 may include generating various information. In one example, the UE generates a channel quality indicator (CQI) a rank indicator (RI), and a pre-decoder matrix indicator (PMI), all within its CSI operation. In one example, CQI is derived from signal to interference plus noise ratio (SINR), which is based at least in part on interference measurement resources, including the interference measurement of both the first waveform (using the NZP CSI-RS resource element) and the second waveform (using the CSI-IM resource element).

Action 605 may include providing CSI feedback to the BS. In this example, the CSI feedback is based at least in part on the channel measurement and the interference measurement of action 604. The feedback may include the CQI, RI, PMI, and/or any other appropriate information. The CSI feedback of action 605 may be provided in a single CSI report, associated with multiple CSI reports, or associated with multiple CSI processing units. Action 605 may include periodic reporting on the PUCCH, semi-persistent reporting on a periodically assigned PUCCH resource, aperiodic reporting on a scheduled PUSCH, or any other appropriate reporting.

At action 606, the UE may update its time domain drifting information. For instance, the UE may receive further information from the BS, and that information may be included in DCI, MAC-CE, or an RRC signal in some examples.

The scope of implementations is not limited to the specific actions described above. Rather, other embodiments may add, omit, rearrange, or modify any of the actions described above.

For instance, in one example, the BS may further configure the UE as conditions change. For instance, one source of interference may disappear, whereas another source of interference may appear, and the BS may configure the UE to stop monitoring a waveform associated with the first source of interference and to instead begin monitoring a waveform associated with the second source of interference. Also, the scope of implementations is not limited to the UE monitoring only one additional waveform. Rather, the capability of the UE may allow it to monitor two or more other waveforms, and the BS may take advantage of that capability by configuring the UE for additional interference measurement.

Also, while the example above is described with respect to a terrestrial UE experiencing interference from an ATG UE, the scope of implementations is not so limited. Specifically, other implementations may include a first ATG UE receiving interference from a second ATG UE (i.e., aircraft-to-aircraft interference), and the BS may configure the first ATG UE to monitor a waveform used by the second ATG UE. In the examples in which a terrestrial UE experiences interference from an ATG UE, those two different UEs would be associated with different BSs. In an example in which interference is between aircraft UEs, those aircraft may be associated with the same BS or different BSs.

Other implementations may include actions performed by the BS. For instance, the BS may receive information regarding ATG interference such as, e.g., by a backhaul to a ATG BS. Once the BS is aware of potential interference by a different waveform and numerology, the BS may generate configuration information to send to the UE to allow the UE to monitor and report the interference. After the BS receives the CSI feedback from the UE, the BS may take action, including choosing a precoder matrix according to the PMI, selecting a different beam that may provide better channel quality, selecting a different waveform or center frequency to provide better channel quality, and/or the like. In fact, the scope of implementations includes any appropriate action on the part of the BS to facilitate communication with the UE despite any interference that may be received.

Various implementations may include advantages. For instance, some implementations recognize that interference experienced by a UE may come from another UE serviced by the same base station or another base station. By contrast, current technology does not provide adequate techniques to handle downlink interference by a UE in another cell. Furthermore, various embodiments recognize that ATG technologies may include different interference concerns than are seen in either terrestrial technologies or NTN technologies. As described above, the speed of aircraft may result in Doppler effect and timing alignment issues, which may be addressed by non-traditional or new waveforms. Various implementations described herein may allow a BS and a UE to reactively or proactively monitor interference toward the UE, even in scenarios where a different waveform may be used by the interfering UE. For instance, the BS may provide configuration information to the UE to allow the UE to monitor and report the interference. As a result, terrestrial UEs and ATG UEs may exist together while interference is minimized.

Figure 8:
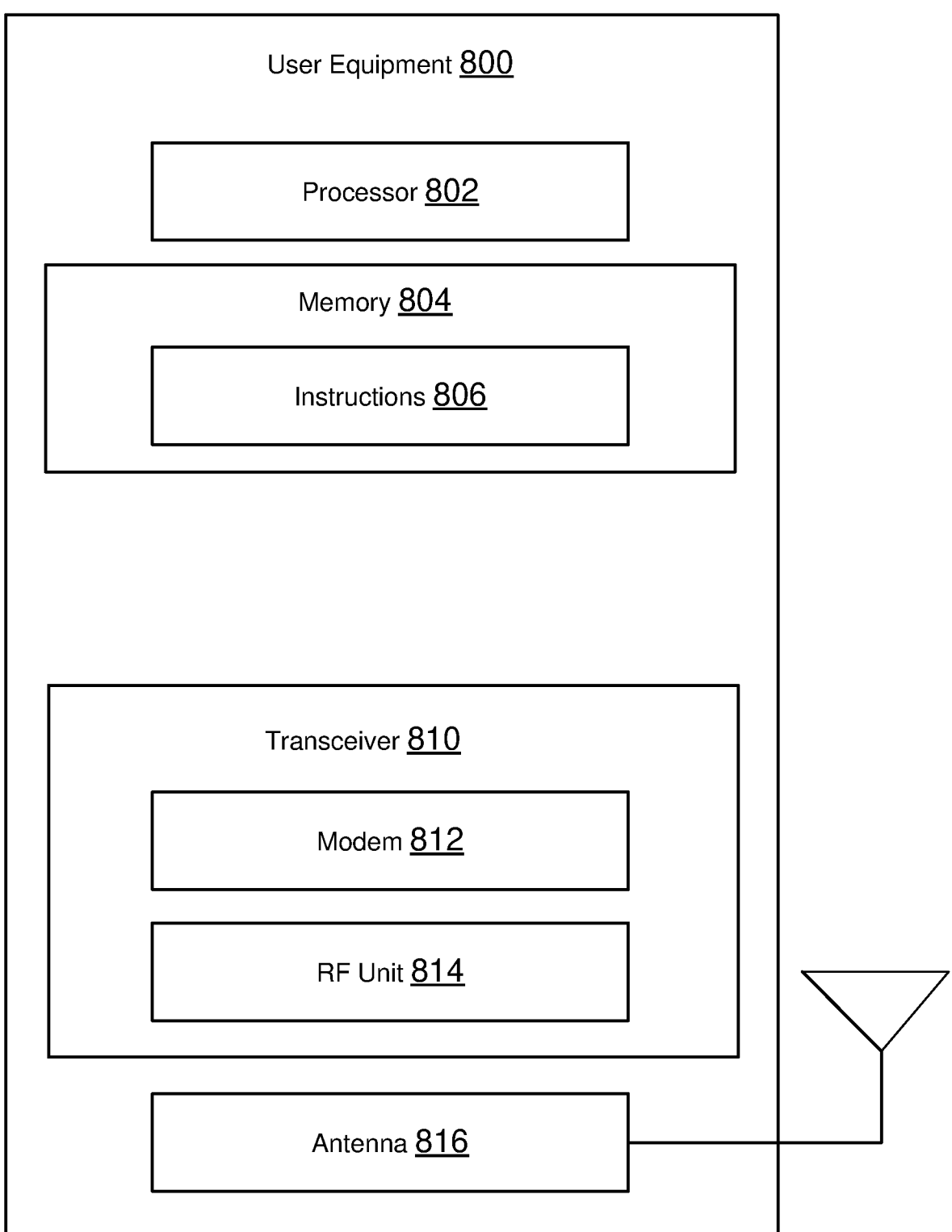
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 discussed above in FIGS. 1 and 5. As shown, the UE 800 may include a processor 802, a memory 804, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. For instance, memory 804 may include a ROM that stores a database, where that database includes information indicating capabilities, such as with respect to waveforms they can be used for PDSCH and waveforms that can be canceled.

In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 1-6. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the beam module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUCCH control information, PRACH signals, PUSCH data, beam refinement request, BFR request, beam switch command, reference signals) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., SSBs, PDCCH, PDSCH, beam switch command, CSI-RS resource configuration, CSI-RS reporting configuration, BFR resource configuration) to the processor 802 processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
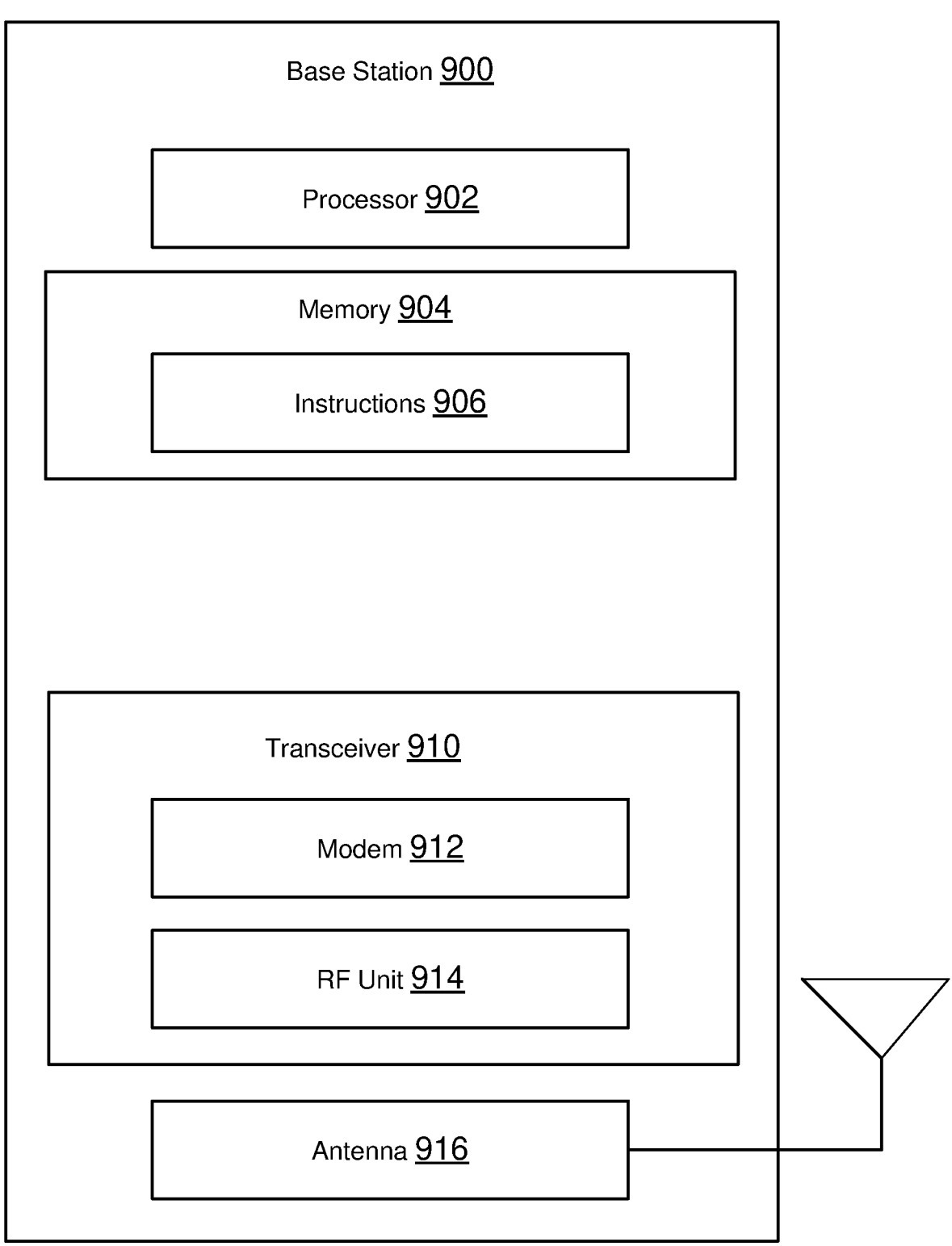
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIGS. 1 and 5. A shown, the BS 900 may include a processor 902, a memory 904, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to cause the other components of the base station 900 to communicate with the UE 800, such as by transmitting SSBs, configurations, and the like, and actions described above with respect to FIGS. 1-5 and 7. Instructions 906 may also be referred to as code, which may be interpreted broadly to include any type of computer-readable statement(s) as discussed above with respect to FIG. 8.

As shown, the transceiver 910 may include the modem subsystem 912 and the RF unit 914. The transceiver 910 can be configured to communicate bi-directionally with other devices, such as the UEs 115 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., SSBs, RMSI, MIB, SIB, frame based equipment—FBE configuration, PRACH configuration PDCCH, PDSCH) from the modem subsystem 912 (on outbound transmissions) or of transmissions originating from another source such as a UE 115, the node 315, and/or BS 900. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may be similar to the antennas of the BS 105 discussed above. This may include, for example, transmission of information to complete attachment to a network and communication with a camped UE 115 according to some aspects of the present disclosure. The antennas 916 may further receive data messages transmitted from other devices and provide the received data messages for processing and/or demodulation at the transceiver 910. The transceiver 910 may provide the demodulated and decoded data (e.g., PUCCH control information, PRACH signals, PUSCH data) to the processor 902 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

Implementation examples are described in the following numbered clauses:

1. A method performed by a user equipment (UE), the method comprising:
    communicating with a base station using a first waveform;
    receiving configuration information specifying an interference measurement resource associated with a second waveform different from a channel measurement resource associated with the first waveform;
    performing channel measurement associated with the first waveform and interference measurement associated with the second waveform, according to the configuration information; and providing channel state information (CSI) feedback to the base station, the CSI feedback based at least in part on the channel measurement and the interference measurement.

2. The method of clause 1, wherein the configuration information comprises a resource setting in a channel state information (CSI)-ReportConfig signal.

3. The method of clauses 1-2, wherein the interference measurement resource associated with the second waveform comprises a channel state information reference signal (CSI-RS).

4. The method of clauses 1-3, wherein the interference measurement resource associated with the second waveform comprises a channel state information interference measurement (CSI-IM).

5. The method of clauses 1-4, wherein the first waveform comprises orthogonal frequency division duplexing (OFDM), and wherein the second waveform comprises orthogonal time frequency space (OTFS).

6. The method of clauses 1-5, wherein the channel measurement resource associated with the first waveform comprises a nonzero power channel state information reference signal (NZP-CSI-RS).

7. The method of clauses 1-6, wherein the CSI feedback comprises a channel quality indicator (CQI) based at least in part on the interference measurement associated with the second waveform.

8. The method of clauses 1-7, wherein the configuration information provides information about the second waveform.

9. The method of clauses 1-7, wherein the configuration information indicates a component carrier or bandwidth part associated with the second waveform.

10. The method of clauses 1-9, wherein the configuration information identifies a time domain offset associated with a starting slot of the interference measurement resource, wherein the time domain offset is identified by an item selected from a list consisting of: a number of symbols of a monitored bandwidth part and time units.

11. The method of clauses 1-10, wherein the configuration information identifies time domain drifting rate information, wherein the time domain drifting rate is further identified by at least one update identifying additional offset subsequent to a number of slots or symbols, and further wherein the time domain drifting rate is identified by an item selected from a list consisting of: a number of symbols of a monitored bandwidth part, and time units.

12. The method of clause 11, wherein the update is received from an item selected from a list consisting of:
    a downlink control indicator (DCI);
    a media access control-control element (MAC-CE); and
    a radio resource control (RRC) signal.

13. The method of clauses 1-10, wherein the configuration information identifies time domain drifting information of the interference measurement resource, further wherein the time domain drifting information is specific to the interference measurement resource or is specific to a set to which the interference measurement resource belongs.

14. The method of clauses 1-10, where the configuration information identifies time domain drifting information of the interference measurement resource, further wherein the time domain drifting information is provided by an item selected from a list consisting of:
    a channel state information (CSI)-ReportConfig signal having a time domain drifting information element with a time domain drifting information index; and a CSI-ReportConfig signal identifying the interference measurement resource with a time domain drifting information index.

15. The method of clauses 1-14, further comprising:

transmitting an uplink signal including an indication of a capability of the UE for monitoring a different waveform, wherein the capability of the UE comprises a number of different waveforms that can be monitored for channel measurement resources or interference measurement resources with respect to a given waveform associated with a physical downlink shared channel (PDSCH) of the UE; and wherein the configuration information indicates the second waveform to be monitored, the second waveform being selected based at least in part on the capability of the UE.

16. The method of clauses 1-16, wherein the UE comprises an air to ground (ATG) UE.

17. A non-transitory computer-readable medium having program code recorded thereon, the program code comprising:

code for receiving configuration information specifying a channel measurement resource associated with a first waveform used by a user equipment (UE) on its downlink and an interference measurement resource associated with a second waveform different from the first waveform;

code for performing channel measurement associated with the first waveform and interference measurement associated with the second waveform, according to the configuration information; and code for providing a channel state information (CSI) report to a base station, the CSI report based at least in part on the channel measurement and the interference measurement.

18. The non-transitory computer-readable medium of clause 17, wherein the configuration information identifies a time domain offset associated with a starting slot of the interference measurement resource, wherein the time domain offset is identified by an item selected from a list consisting of: a number of symbols of a monitored bandwidth part and time units.

19. The non-transitory computer-readable medium of clauses 17-18, wherein the configuration information identifies time domain drifting rate information, wherein the time domain drifting rate information is further updated to identify additional offset subsequent to a number of slots or symbols, and further wherein the time domain drifting rate information identifies an item selected from a list consisting of: a number of symbols of a monitored bandwidth part, and time units.

20. The non-transitory computer-readable medium of clauses 17-19, further comprising:

transmitting an uplink signal including an indication of a capability of the UE for monitoring a different waveform, wherein the capability of the UE comprises a number of different waveforms that can be monitored for channel measurement resources or interference measurement resources with respect to a given waveform associated with a physical downlink shared channel (PDSCH) of the UE; and wherein the configuration information indicates the second waveform to be monitored, the second waveform being selected based at least in part on the capability of the UE.

21. The non-transitory computer-readable medium of clauses 17-20, wherein the configuration information comprises a resource setting in a channel state information (CSI)-ReportConfig signal.

22. A user equipment (UE) comprising:

a transceiver; and a processor configured to control the transceiver, the processor further configured to:

process configuration information from a base station (B S) specifying a channel measurement resource associated with a first waveform and an interference measurement resource associated with a second waveform different from the first waveform, the first waveform corresponding to a downlink configuration of the UE;

perform channel measurement associated with the first waveform and interference measurement associated with the second waveform, according to the configuration information; and provide channel state information (CSI) feedback to the base station, the CSI feedback based at least in part on the channel measurement and the interference measurement.

23. The UE of clause 22, wherein the UE comprises a terrestrial UE.

24. The UE of clauses 22-23, wherein the UE comprises an air to ground (ATG) UE.

25. The UE of clauses 22-24, wherein the configuration information comprises a resource setting in a channel state information (CSI)-ReportConfig signal.

26. The UE of clauses 22-25, wherein the processor is further configured to perform interference measurement associated with the first waveform.

27. The UE of clauses 22-26, wherein the processor is further configured to:

transmit an uplink signal including an indication of a capability of the UE for monitoring a different waveform, wherein the capability of the UE comprises a number of different waveforms that can be monitored for channel measurement resources or interference measurement resources with respect to a given waveform associated with a physical downlink shared channel (PDSCH) of the UE; and wherein the configuration information indicates the second waveform to be monitored, the second waveform being selected based at least in part on the capability of the UE.

28. A user equipment (UE) comprising:

means for receiving configuration information specifying a channel measurement resource associated with a first waveform used by a user equipment (UE) on its downlink and an interference measurement resource associated with a second waveform different from the first waveform and associated with air to ground (ATG) interference directed toward the downlink;

means for performing channel measurement using the channel measurement resource and performing interference measurement associated with the interference measurement resource; and means for providing a channel state information (CSI) report to a base station, the CSI report based at least in part on the channel measurement and the interference measurement.

29. The UE of clause 28, wherein the UE comprises a terrestrial UE within a cell that is encompassed by an ATG cell associated with the ATG interference.

30. The UE of clauses 28-29, wherein the second waveform comprises orthogonal time frequency space (OTFS).

What is claimed is:

1. A method performed by a user equipment (UE), the method comprising:

communicating with a base station using a first waveform;

receiving configuration information specifying a channel measurement resource associated with the first waveform and an interference measurement resource associated with a second waveform different from the first waveform;

performing channel measurement associated with the first waveform according to the channel measurement resource and interference measurement associated with the second waveform; according to the interference measurement resource; and transmitting channel state information (CSI) feedback to the base station, the CSI feedback being based at least in part on the channel measurement and the interference measurement.

2. The method of claim 1, wherein the configuration information comprises a resource setting in a channel state information (CSI)-ReportConfig signal.

3. The method of claim 1, wherein the interference measurement resource associated with the second waveform comprises a channel state information reference signal (CSI-RS).

4. The method of claim 1, wherein the interference measurement resource associated with the second waveform comprises a channel state information interference measurement (CSI-IM).

5. The method of claim 1, wherein the first waveform comprises orthogonal frequency division duplexing (OFDM), and wherein the second waveform comprises orthogonal time frequency space (OTFS).

6. The method of claim 1, wherein the channel measurement resource associated with the first waveform comprises a nonzero power channel state information reference signal (NZP-CSI-RS).

7. The method of claim 1, wherein the CSI feedback comprises a channel quality indicator (CQI) based at least in part on the interference measurement associated with the second waveform.

8. The method of claim 1, wherein the configuration information provides information about the second waveform.

9. The method of claim 1, wherein the configuration information indicates a component carrier or bandwidth part associated with the second waveform.

10. The method of claim 1, wherein the configuration information identifies a time domain offset associated with a starting slot of the interference measurement resource, wherein the time domain offset is identified by an item selected from a list consisting of: a number of symbols of a monitored bandwidth part and time units.

11. The method of claim 1, wherein the configuration information identifies time domain drifting rate information, wherein the time domain drifting rate is further identified by at least one update identifying additional offset subsequent to a number of slots or symbols, and further wherein the time domain drifting rate is identified by an item selected from a list consisting of: a number of symbols of a monitored bandwidth part, and time units.

12. The method of claim 11, wherein the update is received from an item selected from a list consisting of:

a downlink control indicator (DCI);

a media access control-control element (MAC-CE); and a radio resource control (RRC) signal.

13. The method of claim 1, wherein the configuration information identifies time domain drifting information of the interference measurement resource, further wherein the time domain drifting information is specific to the interference measurement resource or is specific to a set to which the interference measurement resource belongs.

14. The method of claim 1, where the configuration information identifies time domain drifting information of the interference measurement resource, further wherein the time domain drifting information is provided by an item selected from a list consisting of:

a channel state information (CSI)-ReportConfig signal having a time domain drifting information element with a time domain drifting information index; and a CSI-ReportConfig signal identifying the interference measurement resource with a time domain drifting information index.

15. The method of claim 1, further comprising:

transmitting an uplink signal including an indication of a capability of the UE for monitoring a different waveform, wherein the capability of the UE comprises a number of different waveforms that can be monitored for channel measurement resources or interference measurement resources with respect to a given waveform associated with a physical downlink shared channel (PDSCH) of the UE; and wherein the configuration information indicates the second waveform to be monitored, the second waveform being selected based at least in part on the capability of the UE.

16. The method of claim 1, wherein the UE comprises an air to ground (ATG) UE.

17. A user equipment (UE) comprising:

at least one transceiver;

memory comprising instructions; and a processor configured to execute the instructions to cause the UE to:

process configuration information from a base station (BS) specifying a channel measurement resource associated with a first waveform and an interference measurement resource associated with a second waveform different from the first waveform;

perform, via the at least one transceiver, channel measurement associated with the first waveform according to the channel measurement resource and interference measurement associated with the second waveform according to the interference measurement resource; and transmit, via the at least one transceiver, channel state information (CSI) feedback to the base station, the CSI feedback being based at least in part on the channel measurement and the interference measurement.

18. The UE of claim 17, wherein the UE comprises a terrestrial UE.

19. The UE of claim 17, wherein the UE comprises an air to ground (ATG) UE.

20. The UE of claim 17, wherein the configuration information comprises a resource setting in a channel state information (CSI)-ReportConfig signal.

21. The UE of claim 17, wherein the processor is further configured to cause the UE to perform, via the at least one transceiver, interference measurement associated with the first waveform.

22. The UE of claim 17, wherein the processor is further configured to cause the UE to:

transmit, via the at least one transceiver, an uplink signal including an indication of a capability of the UE for monitoring a different waveform, wherein the capability of the UE comprises a number of different waveforms that can be monitored for channel measurement resources or interference measurement resources with respect to a given waveform associated with a physical downlink shared channel (PDSCH) of the UE; and wherein the configuration information indicates the second waveform to be monitored, the second waveform being selected based at least in part on the capability of the UE.

23. A user equipment (UE) comprising:

means for receiving configuration information specifying a channel measurement resource associated with a first waveform and an interference measurement resource associated with a second waveform different from the first waveform;

means for performing channel measurement using the channel measurement resource;

means for performing interference measurement using the interference measurement resource; and means for transmitting a channel state information (CSI) report to a base station, the CSI report being based at least in part on the channel measurement and the interference measurement.

* * * * *